Jan. 31, 1933.   H. C. SMITH   1,895,588

LOCKING WASHER AND NUT

Filed Sept. 6, 1929

INVENTOR.
H. C. SMITH.
BY Featherstonhaugh & Co.
ATTYS.

Patented Jan. 31, 1933

1,895,588

UNITED STATES PATENT OFFICE

HENRY CHARLES SMITH, OF FOREST HILL, LONDON, ENGLAND

LOCKING WASHER AND NUT

Application filed September 6, 1929, Serial No. 390,777, and in Great Britain March 20, 1929.

The present invention concerns a locking washer for screw bolts, nuts, and the like and refers particularly to a washer in which two parts or leaves are connected together at one edge but are spaced apart. The apertures in the parts of this washer are screw-threaded to screw on a bolt or the like and a lock is provided on the threads of the bolt by causing a relative lateral movement of the two parts of the washer to take place. This is caused by the edge of one part sliding down the inclined face of an upturned tongue on the other part.

To prevent the metal of the junction of the two parts from being crushed under pressure, the present invention provides a stop, between the two parts, by slitting the tongue reducing the height of the portion between the slits, and bending it inwardly from the root of the tongue. The stop is thus readily and economically formed in the ordinary blanking out operation of forming the washer, and it is effective in any position to which the two parts of the washer may be relatively moved in a lateral direction within the range of the inclined face of the tongue.

Figure 1:
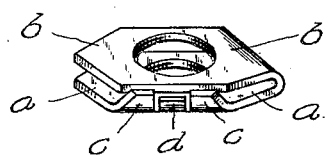
Figure 1 is a perspective view of the preferred embodiment of the invention.
Figure 2:
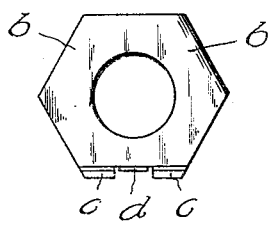
Figure 2 is a plan thereof.
Figure 3:
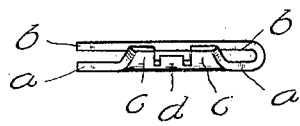
Figure 3 is a side view.
Figure 4:
Figure 4 is a central vertical section on line 4—4 of Figure 2.

My invention is applied to a washer in which one part $a$ of the washer has an upturned tongue $c$ to engage and thrust laterally the adjacent edge of the other part $b$ so as to give a lateral lock on the screw-threads of the bolt.

As shown, a central portion $d$ of the tongue $c$ is made of reduced length; it is separated from the remaining part by slitting and is bent inwardly from the root of the tongue $c$ so as to form the stop between the parts $a$ and $b$ in any position to which they may be moved relatively by the wedge action of the inclined tongue $c$ and the edge of the part $b$. The part $d$ is shorter than the part $c$ to an extent permitting the full locking action of the washer parts $a$ and $b$ on the screw-threads of the bolt before the stop comes into action to prevent the metal at the junction of the parts $a$, $b$, from being strained beyond the elastic limit.

The stop $d$ can be cut in the ordinary blanking operation which shapes the parts $a$, $b$, and $c$, and bent in the bending operation, so that it does not add to the cost of the washer.

I claim:

1. In a locking nut, two flat members spaced apart and connected along one edge and disposed in opposition to each other and, having coaxial screw-threaded apertures to receive a bolt, an inclined tongue on one edge of one of the members directed toward and adapted to be engaged by the corresponding edge of the other member when the members are moved toward each other, and means on said tongue for limiting the extent to which the members may approach each other.

2. A locking nut comprising two spaced apart flat members connected along one edge and having coaxial screw threaded apertures to receive a bolt, a bifurcated tongue inclined upwardly and outwardly from an edge of one of the flat members and adapted to engage the corresponding edge of the other flat member, and an inwardly bent abutment formed between the bifurcated portions of the tongue and adapted to engage the inner face of the other flat member, said abutment being of less height than the bifurcated portion of the tongue.

In testimony whereof I affix my signature.

HENRY CHARLES SMITH.